May 4, 1954 W. B. FAHRENBACH 2,677,744
PORTABLE ELECTRICAL SPOT WELDER
Filed April 27, 1950 6 Sheets-Sheet 1
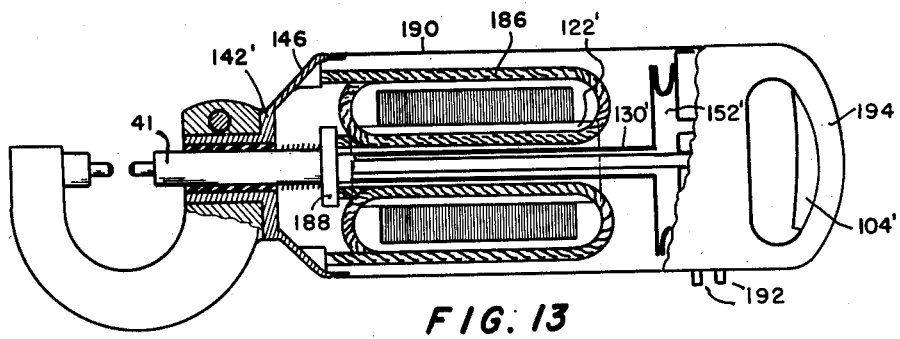
FIG. 13
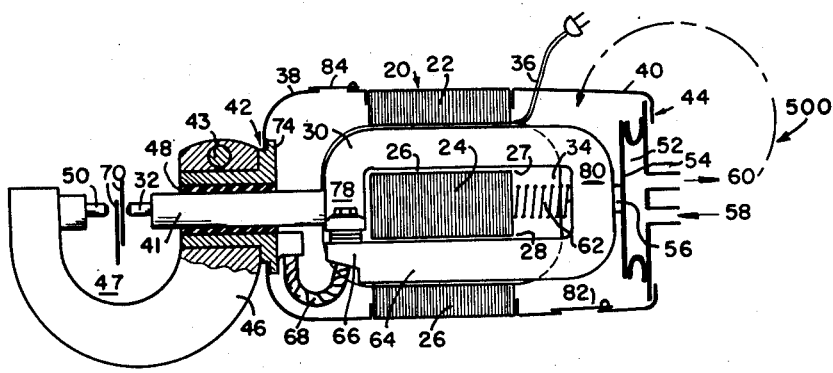
FIG. 1
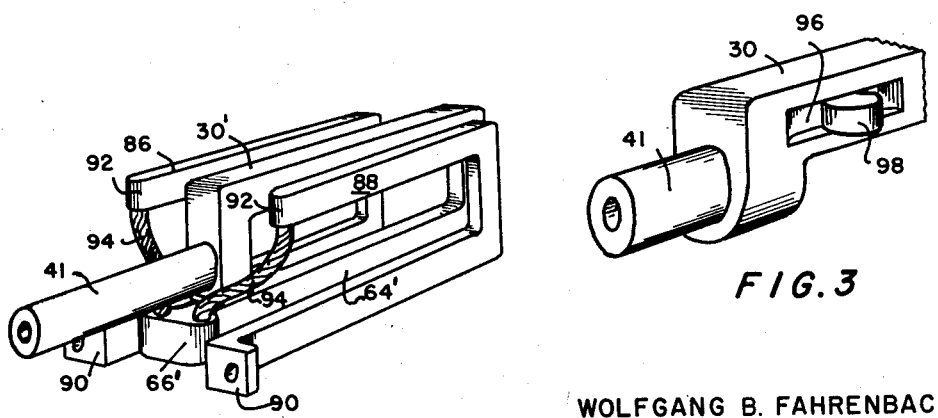
FIG. 2
FIG. 3
WOLFGANG B. FAHRENBACH
*INVENTOR.*
BY *Ernie L. Johnson*
ATTORNEY May 4, 1954 W. B. FAHRENBACH 2,677,744
PORTABLE ELECTRICAL SPOT WELDER
Filed April 27, 1950 6 Sheets-Sheet 2

WOLFGANG B. FAHRENBACH
*INVENTOR.*

BY
*ATTORNEY*

May 4, 1954 W. B. FAHRENBACH 2,677,744
PORTABLE ELECTRICAL SPOT WELDER
Filed April 27, 1950 6 Sheets-Sheet 3
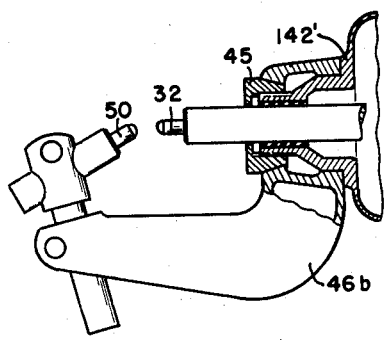
FIG. 7
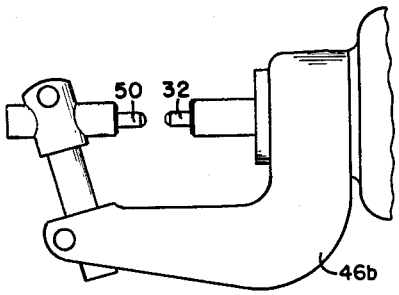
FIG. 8
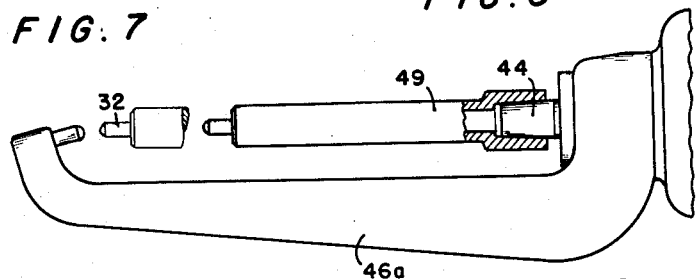
FIG. 6
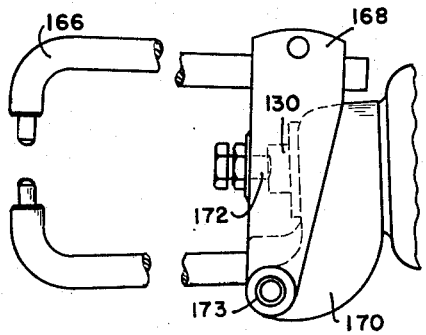
FIG. 9
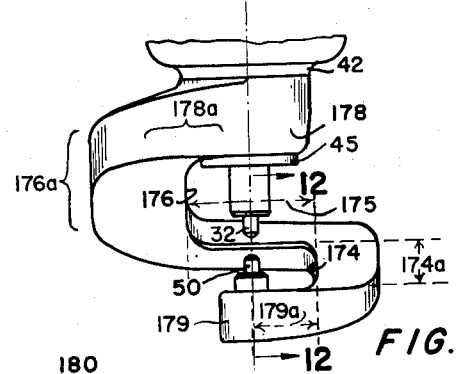
FIG. 11
FIG. 12
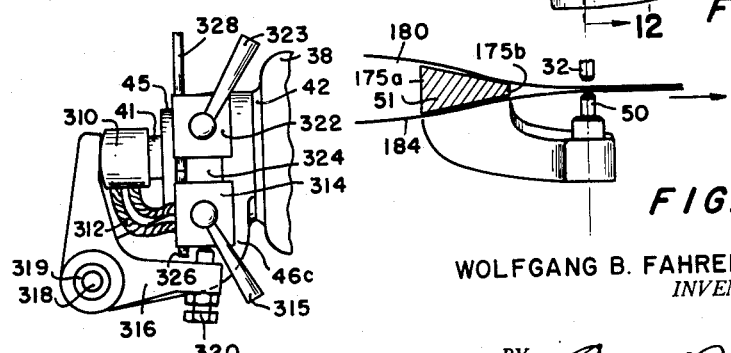
FIG. 10
WOLFGANG B. FAHRENBACH
INVENTOR.
BY *Erwin J. Johnson*
ATTORNEY

WOLFGANG B. FAHRENBACH
*INVENTOR.*

BY
*ATTORNEY*

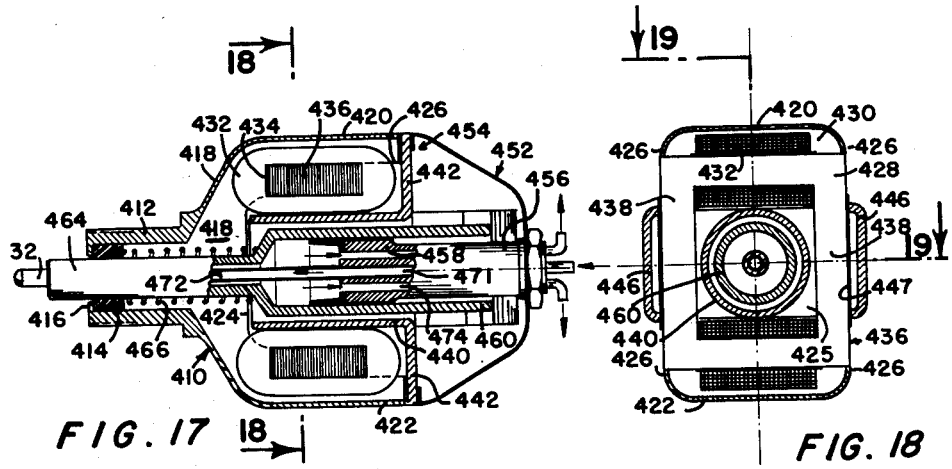
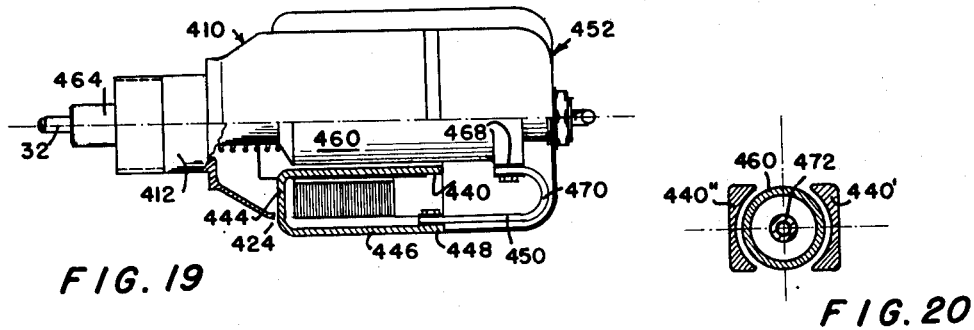
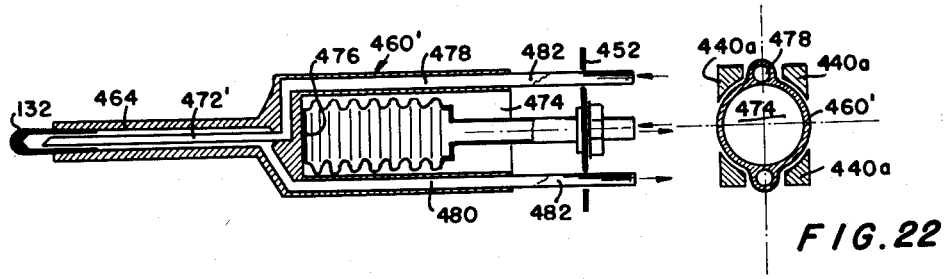

WOLFGANG B. FAHRENBACH
INVENTOR.
ATTORNEY

Patented May 4, 1954

2,677,744

UNITED STATES PATENT OFFICE 2,677,744

PORTABLE ELECTRICAL SPOT WELDER

Wolfgang B. Fahrenbach, Oakland, Calif.

Application April 27, 1950, Serial No. 158,425

2 Claims. (Cl. 219—4)

The invention relates to hand portable electrical spot welders of the gun type which embody a transformer in the hand carried and manipulated unit.

It is one of the objects of this invention to provide a welder of general utility. Since general utility for a hand tool of this character is affected by many considerations, this general objective is served by several unique features of utility, some of which are also applicable in other electrical welding machinery, though possibly with not so many benefits.

Accordingly it is a further objective to provide arrangements of components such that the weight of the tool is minimized. Another object is to effect a reduction in cost of manufacture and operation of such tools.

An additional objective is to provide a tool of improved flexibility in use, both as improving the dexterity of the operator and as extending the types of jobs for which the tool is fitted.

These and other general and particular objectives will be evident to those skilled in the art from a consideration of the following specification, claims, and accompanying drawings.

In the drawings:

Fig. 1 is a somewhat schematic longitudinal section through a welder;

Fig. 2 is a fragmentary perspective of a modification of a detail of a welder;

Fig. 3 is a fragmentary view showing a further detail;

Figs. 6 through 9 illustrate various modifications and details;

Fig. 10 illustrates an adapter for use in butt welding;

Figs. 11 and 12 illustrate special electrode and horn structure for the lap welding of broad sheets, as to which a foreign patent application filing date applies;

Fig. 13 is a somewhat schematic longitudinal section through a modified welder as to which another foreign patent application filing date applies;

Fig. 17 is a section through the main body of a further modification of a welding machine of the portable type, especially designed for light weight through the employment, among other things, of high frequency current and high fluid pressures or high air pressures;

Fig. 18 is a section at plane 18—18 of Fig. 17;

Fig. 19 is a view on the approximate planes shown offset on the broken line 19—19 of Fig. 18;

Fig. 20 shows a modification of a detail for the device of Fig. 17;

Fig. 21 shows alternative details for the motorization and cooling and induction thrust member for the welder of Fig. 17;

Fig. 22 represents a cross section of Fig. 21 along with modifications of the fixed portions of the secondary winding to be embodied with it.

Figure 4:
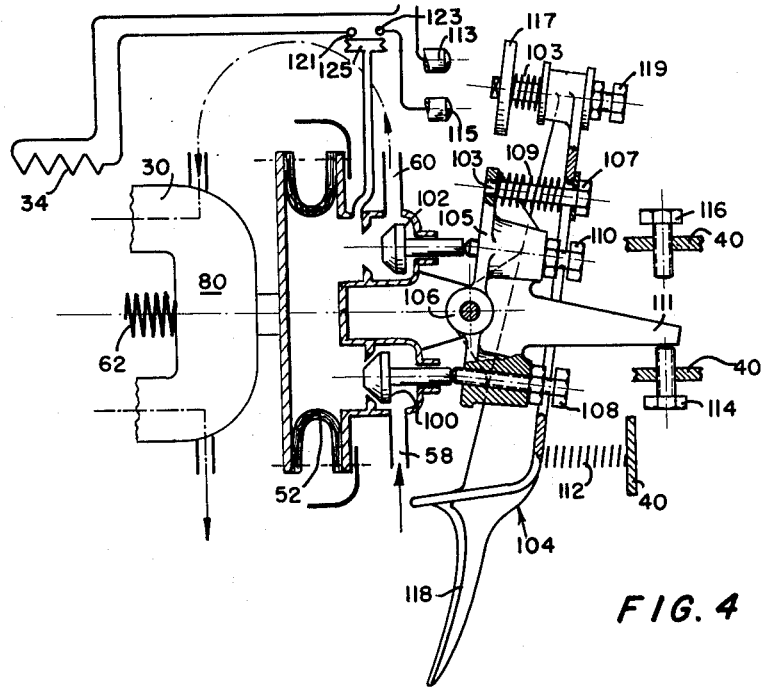
Fig. 4 is a somewhat schematic diagram of a controller for the welder.

Referring now to Fig. 1 the apparatus there shown comprises a transformer core 20 which is shown to be of the shell type having three legs 22, 24, and 26 formed of laminations and clamped together in a conventional manner, but particularly to provide two windows 26 and 28 whose cross sections in planes perpendicular to the drawing sheet, are preferably of uniform areas and uniformly placed along the axes of these windows. These windows from passages for the free reciprocation therethrough of a thrusting element 30 for the moving welding tip 32 both of which parts are hereinafter further and more particularly referred to. In addition the windows 26 and 28 provide a space for the winding on one or both sides of a thrusting element 30 and around the center leg 24, of the primary current winding 34 to which current is conducted by a suitable flexible electrical cable 36 in a conventional manner, and also of a secondary current winding as will be more particularly pointed out.

It is deemed a substantial advantage in itself to so arrange the core of the transformer that the thrusting member passes through a hole in the transformer because by this means in many instances the shape and balance of the gun may be much improved and the mechanism for its operation much simplified. Whether the hole through the transformer be one which is a conventional attribute flowing from the inherent nature of a transformer or whether the hole is formed in the transformer along some other axis than here referred to, this improvement will result in more satisfaction. The hole may be an extra hole made particularly for passing the thrust element 30 alone. For example, referring to Fig. 1, a hole for the thrust member can be provided through leg 24 in line with tip 32.

Inasmuch as the transformer core 20 with the primary winding 34 are of substantial weight and after construction form a substantially rigid body, they together may also be regarded as a base to which the other parts are suitably attached as will be described. The core itself forms a part of the housing as well as part of the base. Two frame members 38 and 40 are suitably attached to the core 20 in the relationship shown, by any convenient means (not shown). These frame members 38 and 40 form extensions of core 20 for positioning the operating mechanisms with respect to the base. In the particular construction shown, the frame 38 supports an electrical terminal 42 at a substantial distance from the core and in a position opposite to, or in suitable alignment as shown with, the axes of the windows 26 and 28 of the core; and the frame 40 supports the base 44 of a motor at a substantial distance from the core and in a position opposite to or in alignment with the axes of the windows 26 and 28 of the core.

The electrical terminal 42 is in itself somewhat massive not only because it conducts the welding current but also because it forms with the frame 38 and core 20 a rigid base for a welding horn 46. Furthermore the terminal 42 forms one bearing and support for the tip thrust member 30. For this purpose the terminal 42 is shown as providing an opening in which a reciprocating bearing part 41 of the thrust member 30 is freely reciprocable toward and away from the stationary welding tip 50 carried by the welding horn 46. It will now be clear that the maximum distance by which the welding tips 32 and 50 may be separated results first from the distance through which the thrust member 30 may be moved and second from the length of the throat 47 formed by the horn 46. As will presently be more particularly pointed out the construction is such that the horn 46 may be detached and replaced by other horns having different purposes.

By the construction here shown and described the thrust element 30 is given rectilinear motion parallel with the line of movement of its bearing part 43. Therefore the length of this movement is limited partially by the length of the bearing part 43 which may, clearly enough, be made as long as one desires it to be, consistent with the need and proportions of other parts.

It is a unique feature of this invention that the thruster 30 extends through the core window 26 and is attached to and driven by a fluid motor 52 mounted on the fluid motor base 44, so that the center of gravity of the transformer is in alignment with and between the motor and the welding tips. The motor schematically shown is of the bellows type providing a piston 54 to which the thrust member 30 is attached at 56.

The piston plate 54 supports the one end of the thrust element 30 in alignment with the axis of movement, suitable guide means, not shown in Fig. 1, being provided on frame 40 for the purpose.

The fluid motor is operated by fluid pressure entering the bellows chamber 52 by port 58 and leaving by port 60. The movement of the bellows by the fluid is opposed by a return spring 62 engaging the base and the element 30 as shown.

In addition to its function of transmitting the motion from piston 54 through the transformer and to the tip 32, the thrust element 30 is also designed to form a substantial portion of the transformer secondary current inductor and weld current conductor. In Fig. 1 the portions 30 and 41 of the thrust element form approximately one half of the total secondary current winding of the transformer. The balance of the winding includes an integral rigid extension 64 which passes through and reciprocates in window 28 of the core and terminates at the leftward outlet thereof in a terminal portion 66. The terminal 66 is joined to terminal 42 by a flexible conductor 68. When the welding tips 32 and 50 are compressed against two lapped metallic parts 70 to be welded together they complete a one turn secondary winding for the transformer and upon energizing the primary coil 34 a welding current passes through tip holder 41 and the thrust member 30, portion 64, terminal 66, flexible conductor 68, terminal 42, horn 46, tip 50, parts 70 being welded, tip 32, and thence to tip holder 41. The terminal 42 is preferably cylindrical and is provided with a central opening having an insulating bearing sleeve 48 fitted to tip holder 41 to prevent current from passing directly between the tip holder 41 and terminal 42. In Fig. 1 the horn 46 is shown to be releasably positioned upon the cylindrical portion of the terminal 42 and fastened with a clamping bolt 43.

The terminal 42 is itself shown in Fig. 1 to be externally cylindrical with a flange 74 by which it is suitably fastened to the edge of an opening in frame 38. It is, in most instances preferred to be threaded to receive a nut 45, as illustrated in Fig. 7, which nut detachably clamps a horn 46 having an eye portion rigidly in position on the frame in any desired rotative position and surrounding the portion 41 of the secondary current circuit, so that no substantial amount of induction in these parts occurs, and electrically firmly contacting the frame.

It will be seen that the frames 38 and 40 each provide spaces between them and the core for the portions 70 and 80 of the secondary winding to occupy, and to reciprocate in, for the required motion of the tip 32 and for the movement of the head 54 of the bellows motor.

The frames 38 and 40 are shown as continuous walls, cup shaped or the like, and as such fully enclose the space around the windings and the moving parts to prevent accumulation of dirt, etc. In Fig. 1 air cooling is illustrated to be provided for, motivated by the hydraulic fluid used to drive the thrust member. For this ventilation inlet flap valve 82 and discharge flap valve 84 operate as the bellows contracts and expands, to respectively admit and discharge air from within the tool housing. It will be appreciated that fresh air coming in cool is heated and in expanding is free to escape at valve 84 even when bellows 52 does not operate. It is, therefore, apparent that the same hydraulic fluid which operates the thrusting device also effects cooling of the windings and related parts of the tool.

In Fig. 2 I have shown a modified form of secondary winding for the transformer apart from the tool. It is the function of this winding to provide more than one complete secondary turn, yet to not exceed one turn that must move in transmitting thrust. This limiting of the movable turns is for the purpose of keeping the weight of the body which has to be pushed by the hydraulic fluid in the bellows 52 to a bare minimum such as in the Fig. 1 construction, yet the winding gives a larger value of secondary induced voltage than is possible in the Fig. 1 situation, assuming the same number of turns in the primary winding 34.

Since approximately only one turn is moved the inertia and speed of response to the action of the bellows found in Fig. 1 is maintained at the desired low inertia value and high speed value, often required of a tool of this character. The construtcion in Fig. 2 comprises the moving thrust member 30' and its extension 64'. Two additional full coils 86 and 88 surround the core leg 24 (the core being omitted in Fig. 2), but coils 86 and 88 are rigidly fastened immovably with respect to the core legs, and the terminal ends 90 of the coils 86 and 88 are rigidly fixed to the terminal 42 of Fig. 1. The end terminal 66' of section 64, being movable, is joined to the ends 92 of the fixed secondary coil sections by flexible conductors 94. The two coils 86 and 88 together form only about one turn composed of two parallel current paths. In Fig. 3 I have illustrated a mechanical guiding detail for maintaining the moving inductor-conductor-thrust transmitter 30 in a fixed path free of binding and electrical engagement with the adjacent portions of coils 86 and 88 in Fig. 2, or of the primary winding 34 in Fig. 1. I provide a rectangular trough 96 in each side of the reciprocating member 30. Each trough is partially occupied by a roller 98, which is of electrical insulating material having a diameter greater than the depth of the trough. The rollers need not normally engage the adjacent inductors 86 and 88, but in the event the moving inductor is deflected by the heavy current it carries or is slightly bowed by the ends thrust upon it, the rollers 98 prevent contact between the moving and the thrust member and adjacent coils and themselves offer a minimum amount of frictional resistance.

In Fig. 4 I have illustrated somewhat schematically a manual controller, mounted on or partially in the housing 40, with which the fluid flow in bellows 52 and the current to the transformer primary winding 34 is controlled. This controller performs the several functions of closing the inlet to 58 when the tool is not in use; fully opening the outlet 60 when the weld is completed so that the return spring 62 withdraws the tip 32 without opposition from the bellows 52; admitting the fluid into bellows 52; and to either permit the maintenance of a selected effective pressure in the bellows while fluid flows or to apply the full unit pressure of the source 58 within the bellows.

To effect these various purposes and results the controller comprises two valves 100 and 102 linked by a common operating device including hand engaged actuating lever arm 104 and an intermediate lever 105, both having a common fixed pivot 106 on frame 40. Adjustable thrust pins 108 and 110 carried on lever 105 determine the respective closures, and the relative degrees of closure, of valves 102 for any position of hand lever 104. The levers 104 and 105, through a certain range of movement of lever 104, are connected in a manner to move as a unit, the connection here being shown to include an appropriately stiff coil spring 109 positioned between the levers and threaded over a pin 103 passing through an opening in lever 104 and having a head 107 to engage the lever 104 with the other end of the pin fixed, as by threading, to lever 105. A stop lug 111, formed integral with lever 105, works between limit screws 114 and 116 adjustably threaded in suitably provided portions of frame 40. The hand lever 104 is returned by a spring 112. The stop 116 stops the movement of lever 105 in its direction of closure for valve 102 and opening for valve 100 and when lug 111 engages stop 116 the degree of closure of valve 102 is determined by the setting of screw 110. At this position also, the adjustment screw 108 through lever 105 determines the degree of opening of valve 100. The difference between the areas of the inlet and outlet openings provided by valves 100 and 102, and the sustained pressure at 58, determine the pressure within bellows 52, yet fluid continues to flow therethrough, and although not shown in Fig. 4, it is evident that the fluid may be additionally directed through cooling channels in a manner presently to be described in reference to other figures of the drawing.

It will be clear that the adjustment of pin 108 may be such that valve 100 is either fully closed when return spring 112 is fully released, in which case spring 62 has no opposition from bellows 52; or the valve 100 may be partly open and valve 102 fully open, in which case only slight and therefore ineffectual opposition to spring 62 is offered, yet the fluid flowing is active for cooling purposes when current is not flowing in the inductor 30. This cooling function will be further referred to.

When valve 102 is closed, or partially closed, the pressure builds up in bellows 52 and drives the actuator 30, as such, to clamp the pieces 70 between tips 32 and 50. However, this movement may, and usually does, terminate before pressure in bellows 52 becomes adequate to apply an adequate clamping force to tips 32 and 50. Such adequate clamping force is determined by the contact resistance between the parts to be welded and should be applied before welding current flows so that a smaller minimum period of current flow will suffice to effect the weld and because the voltage for initiating current flow required of the transformer is reduced by such application of pressure before the weld current flows.

It is desirable that the operator have ready control of the circuit to the primary winding. Accordingly, after lug 111 engages stop 116, further movement of lever 104 is permitted by compressing spring 109. This movement results in the closure of a switch to control the circuit of the transformer winding 34. A self-adjusting switch contact 117 is carried on arm 104 by pin 119 and spring 103, positioned to engage fixed contacts 113 and 115 in the circuit of primary winding 34 only after lug 111 has engaged stop 116, or after valve 102 has closed. The closure of switch 117 across contacts 113 and 115 conditions the circuit of the primary winding for control by the pressure conditions at tips 32 and 50, yet leaves the circuit under control of the operator as respects the determination of the time during which current may flow subject always to the continuance of the proper hydraulic pressure.

It is important to notice that the force exerted on the welding tips is the same at all points in the movement thereof and that after welding starts the welding tips are forced into the softening metal to improve the contact and maintain a high welding tip pressure.

A second pair of contacts 121 and 123 in the circuit of the primary winding 34 are caused to pass current by a pressure responsive switch contactor 125 receiving pressure from the chamber of bellows 52. Thus the primary circuit is finally closed only when a predetermined pressure, as determined by the resistance to movement offered by the pressure switch mechanism is present within the bellows. This pressure determines the minimum pressure at which current may flow. Well known types of adjustable pressure responsive switches 125 may be employed, fixed to base 40.

Accordingly the stop 116 relieves the operator of judging the correct conditions of pressure for each welding operation, and the pressure switch 125 relieves him of guessing as to when the weld tip pressure is adequate. Moreover the adjustments of the screws 107 and 103 determine the amounts of hydraulic pressure producing and cooling fluid flowing both while welding occurs and while the welding current is off. For certain applications it is contemplated that the circuit of winding 34 is to include an automatic time switch and an electromagnetic latch to hold the switch 117 closed so that the operator does not need to time the weld by guess or other means.

Figure 5:
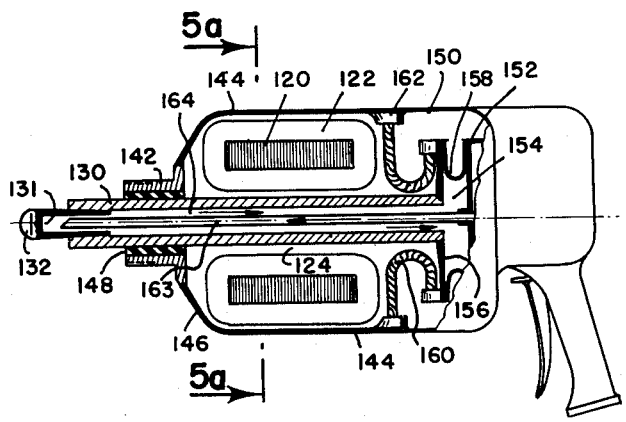
Fig. 5 is a somewhat schematic longitudinal section through parts of a modified welder.
Figure 5A:
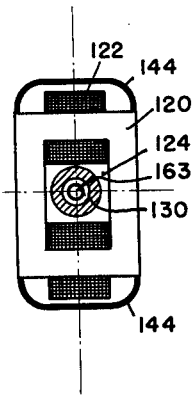
Fig. 5a is a section at plane 5a—5a of Fig. 5.

In the welding machine arrangement of Fig. 5 I have not only incorporated features referred to above but I have also applied them with additional useful and novel features in combination with a ring core transformer structure. It will be evident that a ring core does not afford the same degree of mechanical protection to the coils of the current windings that a shell core does, because over one half of each individual turn in a ring core transformer winding are outside the core windows. The ring core does not itself offer as much housing to the coils as does the shell core. By my invention I employ a part of the secondary conductor to form a housing for the transformer primary coils and to clamp and/or house the transformer laminations and other parts in operative relationships. The secondary operates at very low maximum potential difference between its terminals and it need not be insulated except from the primary circuit, from the core, and from its own terminals. The secondary winding portion which functions also as a housing is shaped as a frame and housing, and provides a large radiating surface for the dissipating of heat, although it is understood that only a relatively small part of the heat is actually generated in the inductor and that the larger part of the heat is generated at the welding tips where relatively high resistance to current flow is encountered.

In addition, in Fig. 5, the fluid, the pressure of which is utilized to drive the welding tips together, is also utilized to cool the movable welding tip and to therethrough extract heat from the welder parts in the region of the weld as it escapes into the conducting metal parts.

In Fig. 5 a ring core 120 is provided with the primary winding 122, the whole being sufficiently large to leave a central passage or window 124 for the free passage therethrough of an inductor thrust member 130 which member corresponds in a general sense to member 30 in Fig. 1. There is also shown a secondary winding of one turn, but here only about one half of this turn is movable. It moves centrally of the core and is moreover straight and may therefore be of uniform diameter from end to end so that it can slide its entire length through the forward terminal 142.

It will be noted that the stationary portion of the secondary winding includes a secondary terminal sleeve 142 corresponding to terminal 42 in Fig. 1 and further includes the wall portion 144 surrounding and supporting the transformer by its primary windings. The wall portion 144 is integral with terminal sleeve 142 through the flared portion 146 which, it may be noted, can as well instead of flaring, be brought snugly against the ends of the adjacent primary coils 122, and be formed of a flat plate to thereby reduce the overall length of the tool. Any horn, as horn 46, is fitted to terminal sleeve 142 as in Fig. 1. An insulating slide bearing sleeve 148 supports inductor 130 for reciprocation therein.

The other (right) end of wall portion 144 supports an extension frame 150 which carries the stationary part 152 of the fluid motor 154. The movable inductor 130 has integrally secured thereto plate 156 forming the moving head of the bellows motor, the bellows 158 joining the plate 156 to the base 152 in a manner to electrically insulate the plate 156 and inductor 130 from base 152. The bellows itself may be of flexible electrically insulative material such as rubber or rubberized canvas. The plate 156 is electroconductive and is joined to the right end of wall 144 by flexible electrical conductors 160. The frame extension 150 is also preferably insulated electrically at the region 162 of joining to the cylinder 144. It will, of course, be evident that the member 144 may be of any suitable shape and may be perforated rather than provide a continuous wall, although a continuous wall is preferred in order to bar foreign matter from the moving parts. It will be seen that pressure fluid entering the bellows motor 154 exerts pressure on plate 156 and moves the inductor 130 in reciprocation. Suitable springs, not shown in Fig. 5, cause retraction of the tip 32.

In addition to its functions of inductor and thrust member, the member 130 is formed as a hollow tube throughout its length, through which hollow tube the fluid which actuates the plate 156 is conducted to the tip 132 to cool it and pass out. Continuous flow is often desirable while the secondary current flows, and as well, often during the current off period of a welding cycle. For this reason the controller of Fig. 4 is employed to permit hydraulic actuating and cooling fluid, such as tap water whose pressure is maintained at a fairly average value of unit pressure, to flow in at an inlet like 58 and out at an outlet like 60, the differential pressure sufficing to move the tip 132 to weld position. Of course if the source of pressure be of low unit pressure it is often possible to stop flow of fluid for an instant while the weld current flows and thus develop a pressure and thrust sufficient to follow up on the softened weld metal with the tip. Immediately the weld current ceases to flow, full flow of the pressure cooling water may be resumed in order to extract the heat from the region of the weld.

It should be particularly observed that the cooling fluid circulation to the welding tip is insured by a unique and simple structure. The thrust tube 130 is made straight from end to end and has centrally disposed therein and spaced therefrom the stationary inflow pipe 163 which is also straight. The pipe 163 is fixed to the frame 150 and extends to a point just short of the range of movement of the bottom of recess 131 in tip 139 which forms the end of the space in tube 130. The incoming water is projected directly against the tip end 131 while still cold and is only thereafter forced back through space 164 in tube 130 surrounding the straight pipe.

The circulation is therefore provided by the two straight concentric tubular members 130 and 163 which function uniformly irrespective of the fact that they are relatively movable. It will be observed that the cooling is also operative on the insulating bearing 148 to preserve its qualities.

In the foregoing described structure it may be observed that the ring core seems to have a length advantage over the shell core. This advantage may, however, be attained in the shell core construction of Fig. 1, for example, by aligning the terminal 42 and thrust member 30 in a straight line with, say, window 26 so that the thrust member is straight as in Fig. 5.

Reference has been made in the foregoing to the interchangeability of welding tip horns. The utility of this interchangeability is illustrated in drawing Figures 6 through 12. In Fig. 6 a long horn 46a is shown. To a tubular tip holder such as 130 in Fig. 5 there is secured an externally tapered adapter 44 having a central passage. A hollow extension tip holder 49 is secured to adapter 44. The tube 163 of Fig. 5 is threaded into the base 152 and may be removed and replaced from the tip end of the tube. Accordingly a tube, like tube 163 but enough longer to reach near the left or tip end of extension 49, is readily assembled when the extension is to be used. Such a long horn 46a is adapted to operations such as welding discs to close the ends of relatively long tubes.

Figs. 7 and 8 show a horn 46b providing for separable tip holders of, respectively, the straight and offset types, and illustrates the detail fastening of the horn 46b to include a nut 45 bearing in a tapered eye of the horn and threaded onto the terminal 142'.

In Fig. 9 the movable tip 166 is carried on a rocker 168 pivoted on a hornlike offset 170. Rocker 168 is rocked by the thrusting inductor 130, a suitable linkage being provided at 172, the rocker 168 being electrically insulated by an insulating bearing sleeve 173 from 170 and electrically connected to the inductor 130 by suitable flexible conductors.

In Fig. 10 there is illustrated an adapter apparatus for joining the ends of two strips of metal, such as wires 326 and 328, by welding their ends together end on. This style of welding is termed butt welding and presents, among other things, the distinct problem of grasping the two parts separately and then forcing their ends together, which problem is somewhat distinct from that of lap welding as it is illustrated in Fig. 1 because, due to the shape of the strips, each part must be independently grasped while being forced against the other part.

The joining of the tips of wires together is uniquely a problem for portable apparatus because such joints are continually being made at points of installation of electrical and other apparatus involving wires and strips of metal. It will, however, be evident that any of the portable apparatus here shown may as well be set up in a fixed location, as in a factory, or the principles of this invention may be applied in appropriate situations involving relatively immovable apparatus.

The illustrated apparatus comprises a horn member 46c secured to the terminal 42 as in other cases. On the horn 46c there is fixed a device 322 embodying a clamp, having a clamp handle 323, for grasping one wire 328 and holding it in a rigid position with respect to the horn. This clamp is electroconductively integral with the terminal 42 through the device, not shown, by which horn 46c is detachably secured to terminal 42. Fixed on the horn is a member 324 providing a reciprocative slideway for a reciprocable clamp device 314 embodying a clamp handle 315. This reciprocable clamp grips the wire 326 and positions it in axial alignment with the end and axis of wire 328, and the reciprocable clamp is guided by slideway 324 so that the wire ends when moved together will abut end on. A spring, not shown, is provided to separate the reciprocable clamp device from 322 when arm 315 or 323 is released.

The member 324 is constructed, as by having an insulating sleeve slide surface, that the reciprocable clamp 314 is insulated from the horn and clamp device 322. Flexible electrical conductors 312 are suitably joined to a special thrust and current transmitting cap 310 which is fixed in electrical contact with member 41.

A bell crank lever 316 is pivoted on a pin 318 secured on horn 46, an insulating sleeve 319 serving to prevent current from passing to the horn from the crank. The crank has threaded therethrough a screw 320 for engaging the reciprocable clamp 314 and for adjusting the lost motion therebetween.

In operation, after the wires 326 and 328 are clamped in alignment by the clamps, the member 41 is driven by the fluid pressure in the bellows thus causing cap 310 to drive the bell crank in rotation about pin 318, the crank in turn causing screw 320 to drive clamp 314 over slideway 324 toward clamp 322.

When the wire ends engage, any motion of the bellows 48 ceases and pressure on the abutted ends of the fires builds up to the desired value, after which current is caused to flow from tip holder 41, through cap 310, through conductors 312 and clamp 314, and thence through the tips of wires 326 and 328 to clamp 322 and thence through horn 46 to terminal 42.

In Figs. 11 and 12 I show a horn shaped to provide what I term a throatless tip holder. This holder permits the formation of a seam joint of two large sheets 180 and 184 having straight edges to be joined, the joined edges of the sheets passing from the tips 32 and 50 toward the observer as he views the device in Fig. 11, and the body of the sheet adjacent one of the unjoined edges passing over the horn portion at the right and only immediately to the left of the tips as seen in Fig. 11, while the body of the other sheet adjacent its edge passes beneath the portion of the horn at the left and immediately to the right of the tips as seen in Fig. 11, both sheet bodies passing over tip 50 and under tip 32 where they are joined by the welding current and pressure.

Figs. 11 and 12 illustrate the details of construction of the throatless tip holder as it is detailed in my German patent application G32,448 filed in the German Patent Office May 29, 1949. The horn has the general shape of slightly more than one turn of a spiral corkscrew, and provides a supporting arrangement for the welding tips such that sheets of large areas may be welded along edges between their joined areas over lapjoined areas along said edges. Thus the large areas of the sheets 180 and 184 to be welded, when regarded as approaching the observer (Fig. 11) and the working region between electrodes 32 and 50 in Fig. 11, extend respectively right and left of the centerline 12—12, and the lapping portions thereof may extend respectively as far as the internal boundary surfaces 174 and 176 of the horn; which surfaces as illustrated are about parallel to each other and to the direction of movement of the two sheets as they approach the electrodes. As in other cases, illustrated specifically in Figs. 1, 7 and 23, the base 178 of the horn is provided with an eye hole provided by rotating bearing surfaces concentric upon an axis generally parallel to the spiral axis and concentric upon the axis of the movable welding tip 32 which bearing surface is arranged so that base 178 fits on the terminal 42 for effecting rotatable adjustability thereof about the axis of reciprocation of tips 32 and low electrical contact resistance between the terminal 42 and horn base 178 when a clamping nut 46 is applied to concentric threading on the terminal 42.

The transverse cross section of the horn body decreases from its base 178 toward the horn point portion 179, to which the remote stationary welding tip 50 is fixed in line with the path of reciprocation of welding tip 32 in a manner to give strength of a cantilever beam but with reduction in section and consequent reduction in weight of the horn. As is seen more clearly in Fig. 12 the "throatless" spiral horn is more specifically described as providing the axially displaced coaxial tip supporting base part 178 and end parts 179 joined by a spiral-like convolution which may be regarded as comprised of five additional functional component integral parts, referring to Fig. 11, which component integral parts are: the lateral base extension 178a which extends from the base part 178 to commence the first part of the convolution and which extends somewhat radially from the axis of the reciprocating electrode; the component forming a base extension arm 176a which extends in the direction of the spiral axis and in a direction opposite to the direction of work approach to the welding electrodes, the transverse arm 175 which extends across the direction of work approach and about perpendicularly across the direction of the spiral axis, the transverse arm extension component 174a which extends further in the direction of the spiral axis and in the direction of work approach and the terminal end extension component 179a.

The distance between the axis of the electrodes 32—50 and the transverse arm 175 in part determines, in inverse proportion to such distance, the degree of bending of the sheets 180 and 184, and as seen in Fig. 12, the cross section of the portion 175 is thick at the sheets input side 175a of the horn and tapers to a minimum wedge edge 175b at the side of the transverse horn component 175 nearest to the welding tips, in this manner allowing the sheets 180 and 184 to approach the welding tips in nearly parallel planes and with minimum bending. As seen in Fig. 11, the surfaces 174 and 176 are nearly parallel and about equally spaced from the center-plane of the work approach at plane 12—12. This defines the upper limiting lap of the edges of sheets 180 and 184, and the surfaces 174 and 176 may serve as sheet edge gauges to insure a uniform guide for the edges of sheets 180 and 184. In so arranging the transverse arm portion 175 as shown so that its top and bottom surfaces are in planes intersecting in a straight line perpendicular to the axis of electrodes 32 and 50, those surfaces assist in guiding the sheets in a straight path to the electrodes.

Fig. 13 illustrates a further modification embodying principles of my invention and is a duplicate drawing of that in my German patent applications P44,416 filed May 29, 1949, and G28,866 filed May 29, 1949. In this modification the secondary winding is partly formed by the bearing sleeve and terminal 142' and the flaring or conical housing portion 146'. The balance of the secondary winding, shown as a total of two turns, includes flexible conductors 186 which are joined to a reciprocating terminal holder 188. The thrust member 130' is a tube similar to tube 130 in Fig. 5. The primary winding is shown at 122', spaced arcuately about the core from the secondary conductors. The conductors 186 may be rubber covered to avoid wear and short circuiting. A rigid frame 190 provides a mounting for the bellows fluid motor 152' and the pressure and cooling water inlet and outlet connections are shown at 192. The frame further provides a handle 194 in which the hand control arm 104' is mounted. It will be evident that the flexible secondary conductor portions 186 tend to coil and uncoil as the thrust member reciprocates. It will also be evident that the thrust and cooling provisions are similar to those provided by the Fig. 5 device.

Figure 14:
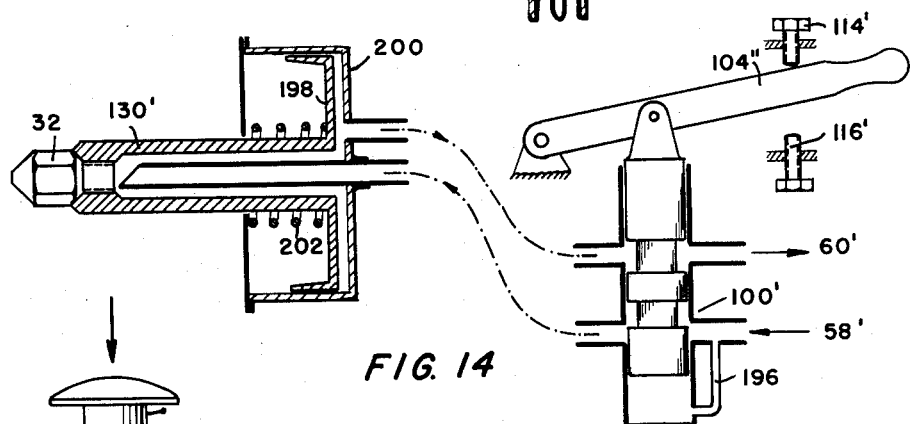
Fig. 14 is a somewhat schematic illustration of details as to which a third foreign patent application filing date applies.

Fig. 14 is a duplicate of the drawing in my German patent applications P44,899 and G29,197 filed May 29, 1949, at the German Patent Office. While the structure is different in form, it performs similar and/or identical functions with that of certain parts of Figs. 4 and 5. The controller is illustrated in the right hand portion of Fig. 14 and the motive members in the left hand portion. A control lever 104" is shown in released position, some fluid being allowed to pass into the cooling passages via valve 100', to cool the electrodes during off periods, in the adjustment shown. A suitable passage 196 is shown so that fluid pressure returns the valve to the inactive position. The inductor-thrust member 130' is actuated by a slide piston 198 in a stationary cylinder 200, with a return spring 202 provided.

Figure 15:
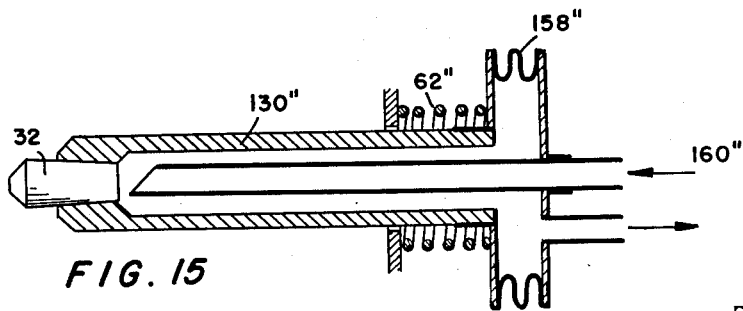
Fig. 15 is a somewhat schematic illustration of a further detail as to which a fourth foreign patent application filing date applies.

Fig. 15 is a duplicate of the drawings in my German patent applications P44,643 and G29,024 filed May 29, 1949, which shows the movable hollow tube inductor thrust member 130" and the stationary cooling water inlet tube 160", with electrical insulating bellows 158" and with movable welding tip 32" and return spring 62".

Figure 16:
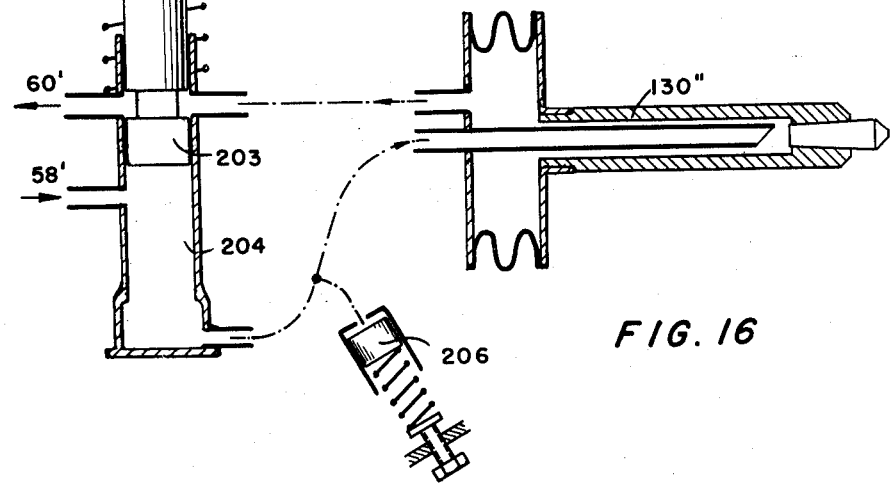
Fig. 16 is a somewhat schematic illustration of a further detail as to which a fifth foreign patent application filing date applies.

Fig. 16 is a duplicate of the drawings in my German patent applications P44,900 and G29,198 filed in Germany May 31, 1949. This device is similar to that in Fig. 14 but provides for applying power to squeeze the welding tips together hydraulically by foot power in the event there is insufficient pressure in the water supply to effect this end.

In the positions of the parts shown, the flow is free and the welding tip is retracted. The movable valve 203 has been retracted by spring 205. This allows cooling in the manner illustrated in Fig. 5, for example. As the outlet 60' in Fig. 16 gradually closes, the thrust member 130" is moved by the inadequate pressure of the water supply, possibly through the full stroke of the tip to the work, but with little force.

Further movement of the valve 209 closes both the inlet and outlet ports 58' and 60' in Fig. 16 and traps a fixed volume of incompressible hydraulic fluid in the cylinder portion 204. Further movement of the piston 203 transmits the force of the foot directly to the bellows motor. It is evident that the stroke and bore of the piston 203 and cylinder 204 are such as to give both the required volume displacement and unit pressure needed to develop the required force. A pressure relief device 206 is also provided to adjustably limit the pressure on the welding tips resulting from foot operation. In this way the tip thrust is controlled.

Figs. 17 through 22 illustrate the invention with added or modified features such that one or more of several specific problems are solved. For example, where relatively high welding tip forces are required the low pressure of a water supply may be inadequate to produce the required tip pressures with a tool of reasonable size and weight. High water pressure, or a pressure booster may then be used, with a smaller bellows or piston area. The weight may also be kept down by multiplying the functions of the secondary winding further so as to replace portions of what otherwise would have to be the framework, the core clamp, and radiating and housing facilities for the internal mechanism. A great exposure of the bare surface of the secondary conductor to the ambient atmosphere, attained by making the exposable part to function as a housing, results in its own lowered operating temperature. Great freedom is attained in this modification for designs to obtain a large cross section of the secondary electrical conductor and in a minimum space yet the metal section is thin at strategic heat dissipating regions and therefore allows the rapid transfer of heat from hot confined regions. These advantages for cooling the secondary winding serve to maintain the resistance voltage drop in the secondary, due to the resistance of the inductor itself, at a minimum value. Therefore a greater portion of the secondary voltage is available to drive current through the parts to be welded. This advantage may, of course, be partially distributed by the designer into reduction of the core section and weight.

In this construction I so arrange and proportion the parts that the driving motor is largely contained within the window of the transformer. This tends to shorten the axial length of the entire tool and further allows for a substantial increase in the distance through which the movable welder tip may be driven as compared with the total length of the tool. It will be seen that this construction has been effected in one case by in part making the movable portion of the secondary winding of the transformer a cylinder, and in another case by making the movable part tubular and arranging for it to contain an expansible bellows of many corrugations to allow a considerable longitudinal expansion.

While it appears in the drawings of this construction that the opening through the transformer core is enlarged, such enlargement is only apparent in the drawings for it will be clear that the diameter of the cylinder is required to be only inversely proportional to the fluid pressure delivered within it in order to deliver a certain thrust. The pressure is increased as desired by suitable pressure sources and regulators not here described.

The constructions in the modifications of Figs. 17 through 21 are particularly fitted for the employment of relatively high frequency alternating currents, since the design permits a tool weight reduction of as much as one third through increasing the frequency for which the machine is designed from sixty cycles to one hundred and eighty cycles per second.

The portable welding unit of Figs. 17, 18, and 19 comprises an integral member 410 which has several functions, including its primary functions of first being a good current conductor and as such forming a part of the secondary and welding circuit of the transformer and secondly being of rigid metal to form a strong housing and clamp for the other parts. The member 410 includes the terminal 412 externally formed to accommodate the various horns as shown in Figs. 7 through 12 and internally fitted with an electrical insulating sleeve 414 corresponding to sleeve 48 in Fig. 1, differing in the particular that an annular flange 416 provides a seat for positioning the sleeve 48 against axial movement in one direction.

In addition the member 410 provides the flared portion 418 of relatively thin cross section from which extend two parallel arm portions 420 and 422 in a fork-like disposition, the inner sides of the arms being joined together by the flared portion terminated at edges 424. The arms 420 and 422 are of arched section transverse their axes to provide clamping edges 426 to engage the edges of the laminations 428 of the transformer core and to provide a space 430 between itself and the core within which a portion 432 of the transformer primary winding is protected and contained as well as a space for the free circulation of cooling air. The clamping edges 426 of each arm extend in a common plane toward the flared portion 418 and terminate at abutment edges 434 which abutment edges extend inward at right angles to edges 426 and form seats for the left end of the stack of laminations 436. The abutment edges 434 are placed to position the stack away from the portion 418 to provide space for the end turns of primary coils 432 and circulation of air. The arched arm sections 420 and 422 are extended rightward of the stack 436 and coils 432 and terminate in a common plane.

As is clearly shown in Fig. 18, the arms 420 and 422 provide an open sided space between them for the reception of the stack 436. The unwound portions 438 of the lamination stack close the sides of this space between the right and left pairs of opposed edges 426 of the arms; except, as seen in Fig. 17, for an opening between the edges 424 and the rear end of stack 436. Suitable means, not shown, are provided to firmly lodge the core and primary in position between the arms and against their edges and abutments.

A portion of the secondary winding is provided by a pipe 440 which extends into the window formed by the core 436. The rightward end of pipe 440 is joined to the ends of arms 420 and 422 by flat bars 442 extending upward and downward as shown in Fig. 17 from the right end of pipe 440. The other, or leftward end of the pipe 440 in Figs. 17 and 19 has attached thereto two laterally extending conductor bars 444 which pass between the arms 420 and 422 adjacent the edges 424 of flared portion 418 and leftward of stack 436.

Thus it will be observed that one substantially complete turn about the core is terminated by bars 444. A second turn is commenced by two longitudinal bars 446 which are joined to bars 444 and which extend rightwardly adjacent core portions 438, strips of electrical insulating material 447 being interposed between the core and the bars 46. The longitudinal bars 446 are provided with a terminal portion 448 adjacent the rightward end of stack 436 to which there is joined a flexible conductor 450 which is, in turn, joined to the movable part of the secondary circuit which will presently be described. In the fabrication and assembly, the member 410 may be a one piece casting of any suitable metal or alloy of metals, such as copper or brass. The portions 440, 442, 444, and 446 of the secondary winding are preferably formed as by casting in one piece and the bends made about the core as illustrated after which the core and this part of the secondary winding are inserted between the arms 420 and 422. Attachment of the portions 420 and 422 with bars 442 is preferably by welding so as to form a fully integrated secondary winding of minimum resistance at this point, and to provide a rigid support. Considerable rigidity is insured because the pipe portion 440 and bars 442 form a cross brace between arms 420 and 422.

An end bracket or bell 452 is rigidly secured to the secondary winding at 454 by any suitable means, being electrically insulated therefrom at this point. A rod like member 456 is rigidly secured on bracket 452 coaxially within pipe 440 and spaced therefrom. Member 456 provides a piston 458 within the window of the transformer. The cylinder slide bearing surfaces of piston 458 preferably are of electrical insulation, such as hard rubber.

A thrust member provides a cylinder 460 received over the piston and a tip holder 464, the rightward end of the cylinder being extendible into an enclosed space at the right end of the secondary provided by bracket 452 with the secondary and core. The leftward end of the cylinder is necked down to relatively small uniform external and internal diameters to provide a hollow tip holder 464 to which welding tip 32 is attached. A return spring 466 is positioned between the shoulder of the thrust member and the insulating sleeve bearing 414. It is to be noted that the piston 458 provides bearing support for the other end of the thrust member. As in other cases the cylinder portion 460 and the tip holder 464 form a portion of the secondary winding, a thrust member, part of a motor, a heat conductor, and a cooling water conduit.

In completing a second turn of the secondary winding, the cylinder 460 is provided with a terminal 468 at the extreme right end, as shown in Fig. 19, to which terminal the flexible conductor 450 is attached. It is evident that the arrangement of the conductor and terminals is such that the flexing of the conductor occurs incident to a progressive shifting of the conductor into and out of the half arc circle shape at 470, thus providing for a long lived connection. Moreover, this conductor can easily be replaced from time to time.

It will be noted that member 456 is of a smaller section toward the frame 452 so as to receive the cylinder 460 entirely thereover and allow maximum retraction of it toward the frame 452.

Cooling and motorization are provided for through the member 456. A passage 471 and pipe 472 extend axially into the tip holder to carry the cooling and actuating liquid thereto and back into the piston chamber surrounding the pipe. The fluid is carried off through the passages 474 which are placed off center. Any of the devices described herein may be provided to control the flow of fluid and to effect the motions and thrusts required.

While the structure of Figs. 17, 18 and 19 shows two secondary turns, it is believed to be clear that the portions 444, 446, and 456 may be omitted where but one turn is required, in which situation the tipholder 464 is connected to the leftward end of pipe 440.

In Fig. 20 I show a modification of the conductor portions 440 as seen best in Fig. 18. Here the conductor is divided into two parts 440' and 440'' which are, evidently, shaped to make greater use of the space of the transformer window 425, for carrying current and for allowing use of a relatively larger cylinder 460. The loss of rigidity provided by the pipe 440 in Fig. 17 is taken into account in the design of the frame portion 452.

In Figs. 21 and 22 there is shown a somewhat modified form of the cylinder 460 and thrust member of Figs. 17, 18, and 19 which form provides for the attainment of additional results. In this case a cylinder 460' provides a central well 474 against the bottom of which is projected the moving end 476 of a bellows contained in the well. This bellows is actuated and controlled to provide the required travel and thrust of and through the tip holder 464. The fluid admitted into bellows 476 is in this case not the same fluid as is admitted into the cooling circuit, and may be compressed air, about the advantages of which more will be stated presently.

The cylinder 460' further provides passages 478 and 480, the inlet passage 478 extending to the pipe 472' and to the welding tip 132 therethrough, and the outlet passage 480 extending from the space in the tip holder 464 surrounding the pipe 472'. Flexible rubber hose sections forming the fluid passage at 462 provide for freedom of movement of the cylinder. In this arrangement the portion 440a of the secondary winding adjacent the cylinder is shown divided into four parallel paths in order to reduce the total area over which the secondary turns are distributed in the transformer window.

Compressed air operation provides not only high speed of response and the ever ready surrounding atmospheric as a depositary of the spent air, but also includes the advantage that it is employed as a device for cooling the enclosed parts, particularly the coils of the primary winding, which coils receive no direct cooling such as that provided by fluid cooling of the welding tips and the movable part of the secondary. Moreover, whether a liquid coolant is used or not, the use of compressed air instead of liquid removes a large factor of cumbersomeness because of there being no need of a return hose, and also removes considerable weight from the tool itself because air weighs less than any hydraulic liquid likely to be used.

The foregoing description of the apparatus of Fig. 1 pointed out that the action of the bellows and valves 84 is to drive the heated air out of the enclosed equipment, sucking further air in along with it. In lieu of, or in addition to these provisions, when compressed air is provided for actuating the bellows, a valve which releases the air from within the bellows has an outlet passage therefrom directed into the enclosed space with the primary winding and other apparatus. As the compressed air escapes from the outlet passage it expands and crowds substantially all of the previously contained and heated air out through the openings, such as at 84 in Fig. 1, and itself replaces the air. This air when so released from a high pressure to the inside of the housing is rapidly cooled of its own expansion and is accordingly in condition to absorb further heat from the primary coils, and other apparatus with which it comes into contact. In absorbing this heat it expands further and escapes through the flap valve to the extent determined by the resulting pressure within the housing. During the following welding cycle the remaining air absorbs heat and is subsequently crowded out by the next release of air from the motor. The path for the discharge of such air is illustrated by the curved line 509 in Fig. 1, though it is evident that any path into the interior of the housing from the valve will suffice. Now it will be appreciated that the welder mechanism may be entirely enclosed, with but one valve for discharge of such cooling air from the housing, and no ports available for the admission of air other than that which comes from the compressed air supply. In this way all dust particles, moisture, and like material may be excluded.

Figure 23:
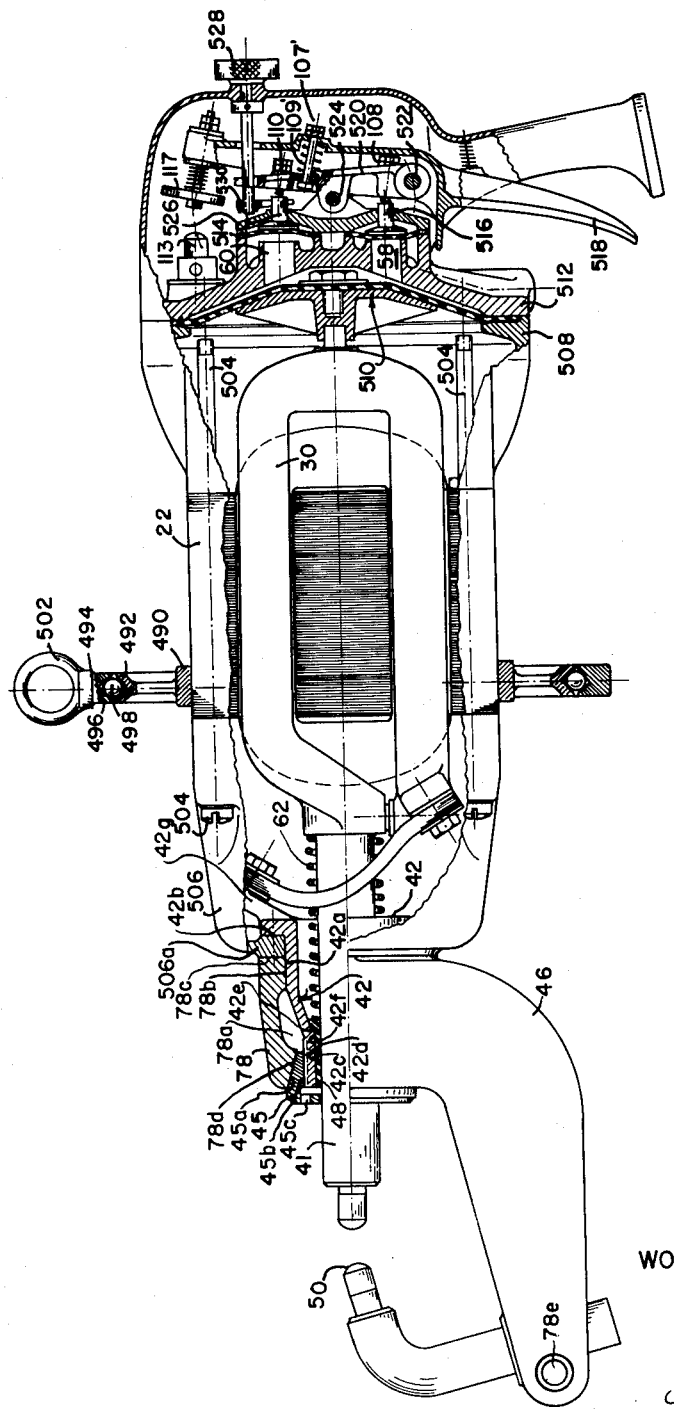
Fig. 23 illustrates a further modification of the portable welding tool as applied with a monorail carrier system and provided with different types of motor and fluid control devices.

In Fig. 23 there is shown a tool embodying features in addition to many of those elsewhere illustrated. Particularly, the tool is supported by its core centrally mounted in a rotatable spider 490 having a peripheral circular ball raceway 492 rotatively coupled to a surrounding ring 494 having a ball companion raceway 496 through roller balls 498. An eye 502 provides for hanging the tool from an overhead support or monorail system.

The core 22 has secured thereto by through bolts 504 two frame members 506 and 508. The movable secondary 30 is driven by a diaphragm motor 510, a head 512 suitably fastening the motor diaphragm to frame member 508. The head 512 includes valving chambers over inlet and outlet passages 58 and 60, the valves including closure diaphragms 514 actuated by headed plungers 516. The actuating control mechanism for the valves is mechanically somewhat different from that which I have illustrated in Fig. 4 although it produces similar effects. A lever 518 is pivotally linked to a second lever 520 on a floating pivot 522 which second lever is pivoted at 524 on valve base 526. A spring 109' and pin 107' hold the lever in fixed relation until lever 520 is stopped in its movement and thereafter lever 518 pivots on pivot 522. The degree of opening of the outlet valve at 60 is adjusted by a thumbpiece 528 having a shank threaded through a yoke 530 straddling plunger 514 and disposed in the path of lever 520.

DETAILED FEATURES

The foregoing description refers somewhat generally to various structures unique features of which are hereinafter described with reference to the drawings.

Electrode structure

Various specifically variant provisions are made for mounting the horn or yoke 46 in a manner so that the fixed tip 50 may be fixed in alignment directly on the axis of reciprocation of the axis of movement of the electrode contact tip 32 by plunger 41. When this alignment is provided for the maximum effective thrust occurs across the work and the neatest spot weld occurs through the shortest current path between tips 32 and 50, and side thrust between bearing surfaces of plunger 41 and insulator sleeve 48 are minimal. There is, under these conditions, no resultant turning moment about the weld point at the time of exertion of welding pressure particularly if the axis of plunger 41 is held normal or perpendicular to the plane of the work surface, as shown in Fig. 1. It will be observed also that irrespective of the rotary position of horn 46, the tip 32 serves as an accurate pointer which is in view of the operator and can therefore be used by the operator to locate the spot on the work where a weld will result upon cycling the pressure and current flow control. Inasmuch as the direction of pointing of the movable electrode is always the same with respect to the balance of the gun, considerable accuracy may be acquired in the placing of the weld by an operator, irrespective of the rotary disposition of the horn on the hornpost.

Inasmuch as the greater number of the most advantageous features of the electrode structure are illustrated by the device of Fig. 23, it is now described extensively in detail and material departures therefrom found in other modifications will thereafter be referred to.

The electrode structure of Fig. 23 comprises, among other things, a separable component part 42, here called an annular electroconductive component or an annular pivot and electrical separable terminal connector post for the horn, a separable companion part 46 constituting the annularly adjustable horn or yoke of the welder, of which there are many interchangeable styles shown and equally fittable to the annular or tubular post 42; the reciprocable inductor-conductor-driving plunger 41, an annular clamping nut 45, a bearing insulator sleeve 48, and the fixed electrode or welding tip 50 fixed on the free end of horn 46.

The annular pivot and connector post 42 is generally tubular and provides a preferably circularly cylindrical external centering surface 42a intermediate its ends and concentric upon the axis of the post 42. One end of the post 42 provides an annular flange having a shoulder abutment surface 42b disposed in a plane radial upon the post axis and facing in the direction of the other end of the post 42. The post 42 provides on the other end 42c thereof external concentric threading 42d. The tube 42 is reduced in diameter from the flange to the threaded end and provides intermediate the ends thereof an internal annular shoulder 42e disposed toward the flanged end for the seating thereagainst by the plunger return spring of the flange insulator sleeve 48 the shank of which sleeve 48 seats within a concentric seating surface portion 42f of post 42.

The horn 46 provides integrally therewith the horn post receiving base 78 providing the bearing and clamping hole 78a comprising the internal cylindric centering surface portion 78b, and the endwise disposed abutment surface 78c formed in a plane radial upon the axis of centering surface 78b. The hole 78a is further formed at the other end thereof with an internal conical centering surface and clamping area 78d with its conical axis coincident with that of surface 78b. The surface 78b is complementary to surface 42a so as to slide thereonto and to receive axial alignment support therefrom, and when cylindrical it may provide rotary bearing support for the purposes of adjustment. The other end of horn 46 provides means 78e of attachment thereto for a tip holder by which tip 50 may be positioned upon the axis of surfaces 78b and 78d.

The clamping nut 45 is sleeve-like and provides at one end thereof concentric coaxial external cone taper surface 45a and internal thread 45. Surface 45a is driven against the surface 78 to which it is complementary in that both conic surfaces are of the same angularity to their respective axes, by threads 45b and 42d, the nut being provided with suitable wrench engageable surfaces such as holes 45c for a spanner wrench.

In the electrodynamics of welding the welding current circuit carries very high values of current, the welding heat effectiveness of which is proportional to the square of the value of current actually flowing. The low voltages generated in the welding circuit may easily be dissipated at regions where the dissipation is useless and wasteful, as well as productive of requirements for a transformer and other components adequate to provide for the waste as well as the useful energy dissipated at the welding tips. For this reason I prefer to provide the welding current circuit with a minimum number of pressure connectable components, and wherever convenient use only mere pressure connections in the circuit at the tips where welding occurs. I prefer, for example to make all connections of integrated metal bodies in lieu of which at times it is necessary to make them of flexible cables joined to other components at least by surely and permanently bolted separable pressure connections such as where such flexible cables should be readily replaced at intervals due to the breakage of individual strands thereof. In this way a minimum of the driving electromotive force and heat energy are dissipated in the circuit at regions other than at the work, where the maximum voltages are therefore available to effect the weld.

Accordingly, the electrode structure just previously described is firmly secured together with the nut 45 firmly electroconductively contacting surface 78d and threads 45b and driving the contact abutment surface 78c toward and in some cases into firm abutment with the surface 42b.

The other important function of this clamping action is to always center the horn on the axis of reciprocation of the plunger 41 so that, once the welder tips are axially aligned, they resume exact alignment in any clamped position to which horn 46 may be rotated and clamped after loosening of nut 45. It is clear, therefore, that the bearing of horn 46 is an adjustment bearing and not a bearing of free rotation while current flows. The high pressure clamping action between nut 45, the horn base 78 and/or the annular post 42 makes for a very high conductivity pressure formed joint and for a minimum of voltage and heat loss at this adjustable joint. It will be evident that the greater the number of such joints there are in a circuit the greater must be the number of secondary inductors to achieve a given welding current in the circuit, other factors remaining equal.

It should be observed that no rotation is required for the plunger 41 in the insulating sleeve bearing 48.

As applied to the welder frame 506 in Fig. 23 the circuit components 42 and 78 grip an annular lip 506a of the frame therebetween. Post 42 has integrally formed therewith a separable connector lug 42g to which the plunger inductor 30 is connected by a flexible conductor strap and by bolt structure. The annular post 42 also provides a recess therebetween and surrounding the plunger 41 and between sleeve 48 and the inductor 30 through which a plunger return spring 62 extends to hold sleeve 48 in place as well as to receive stoppage thereat to resist welding movement of the plunger.

It will be observed that in Fig. 23, as well as in modifications of other figures, the release and/or removal of any horn 46 from the annular horn post 42 in no way disturbs the horn post 42 and its mechanical and electrical connections to the inductor of the welding current circuit.

In the other illustrations of the connector post 42 it is directly integrated with and in the rigid frame attached, or housing forming portion, of the current inductor with the inductor circuit being completed to the movable inductor from some portion of said rigid frame inductor by a flexible conductor, the flexible conductor being employed at any of several regions in the circuit as is made more clear by comparing the like positions of a short flexible cable section for the circuit in Figs. 1 and 23 as joining the annular post 42 to the beginning of an almost completely reciprocating inductor 30 with the modifications of Figs. 17, 18 and 19 wherein only the plunger 460—464 is movable and constitutes but about one-third of one secondary winding turn as compared to about one and two thirds of the secondary winding turn formed by the rigid parts 412, 418, 420, 442, 440, 444, and 446 to which later component it is joined by the flexible cable circuit component 470.

As seen in Fig. 2 the movable portion of the secondary circuit inductor is about one turn joined by short flexible cable circuit components 94 to a second divided full rigid turn which is rigidly attached to the horn post 42; but in Fig. 13 only a small portion of the inductor circuit is of the rigid inductor material suitable for force transmission, the greater part of the inductor being provided in turns of flexible cable 186.

I claim:

1. A welding horn having a generally spiral shape and having welding electrodes adjacent its extremities disposed toward each other along the axis of the spiral, one of said electrodes being stationary and extending to a point along said axis substantially coaxially with a region on the spiral one-half convolution displaced from the stationary electrode.

2. An electrical welding tool comprising, in combination: a transformer, a hole through said transformer, means providing fixed and movable welding tips positioned adjacent said transformer at one end of said hole, a motor positioned adjacent said transformer at the other end of and outside of said hole, and means extending freely through said hole and spaced from the transformer hole surfaces and extending to the movable welding tip and to the motor for driving the tip by the motor.

References Cited in the file of this patent

UNITED STATES PATENTS

| Number | Name | Date |
| --- | --- | --- |
| 2,041,913 | Fassler | May 26, 1936 |
| 2,126,903 | Martin | Aug. 16, 1938 |
| 2,236,162 | Von Henke | Mar. 25, 1941 |
| 2,269,726 | Martin | Jan. 13, 1942 |
| 2,457,606 | Senn | Dec. 28, 1948 |

FOREIGN PATENTS

| Number | Country | Date |
| --- | --- | --- |
| 697,193 | Germany | Oct. 8, 1940 |